(12) United States Patent
Stevens (10) Patent No.: US 9,371,792 B2
(45) Date of Patent: Jun. 21, 2016

(54) ACTIVE TUNING SYSTEM FOR ENGINE CONTROL UNIT

(71) Applicant: Hondata, Inc., Torrance, CA (US)

(72) Inventor: Derek Stevens, Redondo Beach, CA (US)

(73) Assignee: Hondata, Inc., Torrance, CA (US)

( * ) Notice: Subject to any disclaimer, the term of this patent is extended or adjusted under 35 U.S.C. 154(b) by 361 days.

(21) Appl. No.: 13/928,802

(22) Filed: Jun. 27, 2013

(65) Prior Publication Data

US 2015/0006066 A1    Jan. 1, 2015

(51) Int. Cl.
| | |
|---|---|
| *F02D 43/00* | (2006.01) |
| *F02D 41/24* | (2006.01) |
| *F02D 41/26* | (2006.01) |
| *F02P 5/15* | (2006.01) |
| *F02P 5/152* | (2006.01) |
| *F02D 35/02* | (2006.01) |
| *F02D 41/06* | (2006.01) |
| *F02D 41/00* | (2006.01) |

(52) U.S. Cl.
CPC .......... *F02D 41/2451* (2013.01); *F02D 35/027* (2013.01); *F02D 41/2445* (2013.01); *F02D 41/2454* (2013.01); *F02D 41/263* (2013.01); *F02P 5/151* (2013.01); *F02P 5/152* (2013.01); *F02D 41/062* (2013.01); *F02D 41/2493* (2013.01); *F02D 2041/001* (2013.01); *Y02T 10/46* (2013.01)

(58) Field of Classification Search
CPC ... F02D 35/027; F02D 2250/14; F02D 37/02; F02D 41/005; F02D 41/2445; F02D 41/2451; F02D 41/2454; F02D 41/2493; Y02T 10/46; Y02T 10/42; Y02T 10/123

USPC .............. 701/101, 102, 103, 104, 111, 115; 123/406.33, 435, 436, 406.29, 406.39, 123/406.26, 406.3, 406.55, 625, 90.15; 73/35.01

See application file for complete search history.

(56) References Cited

U.S. PATENT DOCUMENTS

| | | | | |
|---|---|---|---|---|
| 4,309,971 | A * | 1/1982 | Chiesa ................ | F02D 41/2422 123/480 |
| 5,000,149 | A * | 3/1991 | Miyama ............... | F02P 5/1527 123/406.33 |
| 5,000,150 | A * | 3/1991 | Miyama ............... | F02P 5/1521 123/406.33 |
| 5,035,219 | A * | 7/1991 | Ohkumo .............. | F02P 5/1506 123/406.33 |
| 5,038,736 | A * | 8/1991 | Ohkumo .............. | F02P 5/1455 123/406.33 |
| 5,267,164 | A * | 11/1993 | Miyama ................. | F02P 5/152 123/406.33 |
| 5,341,641 | A * | 8/1994 | Nakajima ............ | B01D 53/9495 123/674 |
| 5,483,945 | A * | 1/1996 | Kobayashi .......... | F02D 41/2445 123/374 |
| 5,738,074 | A * | 4/1998 | Nakamura ........... | F02D 35/023 123/305 |
| 5,778,857 | A * | 7/1998 | Nakamura ........... | F02D 35/023 123/406.29 |

(Continued)

*Primary Examiner* — John Kwon
*Assistant Examiner* — John Bailey
(74) *Attorney, Agent, or Firm* — Fulwider Patton LLP (57) ABSTRACT

A method for an engine control unit to update internal tables based on feedback from the engine without external computing, comprising the steps of establishing flash memory and RAM memory in the ECU, assigning a portion of the RAM memory to storage of a table of engine conditions from the flash memory, updating all program code pointers to the table to read the table from the assigned portion of RAM, and revise the table in RAM based on input received from the engine sensors.

4 Claims, 8 Drawing Sheets

(56) References Cited

U.S. PATENT DOCUMENTS

| | | | | |
|---|---|---|---|---|
| 6,560,528 B1* | 5/2003 | Gitlin | F02D 41/263 | 123/406.62 |
| 9,038,596 B2* | 5/2015 | Glugla | F02D 41/0087 | 123/198 DB |
| 2005/0039721 A1* | 2/2005 | Truscott | F02D 35/023 | 123/406.22 |
| 2005/0045158 A1* | 3/2005 | Takahashi | F02D 13/0219 | 123/506 |
| 2006/0042593 A1* | 3/2006 | Nakamoto | F02D 9/109 | 123/399 |
| 2006/0047374 A1* | 3/2006 | Hashimoto | G06F 1/30 | 701/1 |
| 2007/0208486 A1* | 9/2007 | Yasui | F01L 1/34 | 701/101 |
| 2009/0139478 A1* | 6/2009 | Dell | F01L 1/02 | 123/90.31 |
| 2010/0222988 A1* | 9/2010 | Thomas | F02D 41/2438 | 701/103 |
| 2011/0139118 A1* | 6/2011 | Glugla | F02D 35/027 | 123/406.29 |
| 2011/0139120 A1* | 6/2011 | Rollinger | F01L 1/34 | 123/436 |
| 2011/0144883 A1* | 6/2011 | Rollinger | F02D 13/06 | 701/102 |
| 2011/0191007 A1* | 8/2011 | Glugla | F02D 41/0085 | 701/103 |
| 2012/0035835 A1* | 2/2012 | Glugla | F02D 35/027 | 701/111 |
| 2012/0079889 A1* | 4/2012 | Kohno | F02D 41/0002 | 73/861 |
| 2012/0125295 A1* | 5/2012 | Senda | F02P 5/14 | 123/478 |
| 2013/0151052 A1* | 6/2013 | Fukuzawa | B60W 20/00 | 701/22 |
| 2014/0000552 A1* | 1/2014 | Glugla | F02D 43/00 | 123/295 |
| 2014/0000557 A1* | 1/2014 | Glugla | F02D 41/008 | 123/435 |
| 2014/0067233 A1* | 3/2014 | Nishida | F02D 41/20 | 701/103 |
| 2014/0109868 A1* | 4/2014 | Zhu | F02D 41/0072 | 123/349 |

* cited by examiner

Active Fuel Tuning
- ☑ Active fuel tuning enabled (HO)                          — 500

Options
- ☑ Closed loop (HO)
- ☑ Open loop (HO)                                            — 510
- ☐ Use corrected wideband (HO)
- ☑ Use fuel trims (HO)

Settings

| | | |
|---|---|---|
| Tuning method (HO) | 0 | dec |
| Delay after engine start (HO) | 30 | s |
| Delay after injector re-start (HO) | 500 | ms |
| Change per tuning cycle (HO) | 1.95 | % |
| Delay in lambda reading (HO) | 200 | ms |
| Update frequency (HO) | 50 | ms |
| Maximum change (HO) | 9.77 | % |
| Maximum cam angle delta (HO) | 5 | + |
| Minimum load delta (HO) | 5.26 | kPa |
| Maximum rpm delta (HO) | 250 | rpm |

— 520

Conditions

| | | |
|---|---|---|
| Minimum rpm (HO) | 1000 | rpm |
| Maximum rpm (HO) | 8000 | rpm |
| Minimum load (HO) | 13.16 | kPa |
| Maximum load (HO) | 105.26 | kPa |
| Minimum TPS (HO) | 1 | % |
| Maximum TPS (HO) | 110 | % |
| Minimum gear (HO) | 0 | |
| Maximum gear (HO) | 6 | |
| Minimum VCT (HO) | 0 | + |
| Maximum VCT (HO) | 50 | + |
| Minimum ECT (HO) | 158 | °F |
| Maximum ECT (HO) | 248 | °F |
| Minimum IAT (HO) | 50 | °F |
| Maximum IAT (HO) | 185 | °F |
| Minimum lambda (HO) | 10.69 | AF |
| Maximum lambda (HO) | 18.09 | AF |

ACTIVE TUNING SYSTEM FOR ENGINE CONTROL UNIT

BACKGROUND

A vehicle's engine control unit (ECU) is a type of electronic device that controls a series of actuators on an internal combustion engine to ensure the engine runs at its optimal setting. ECUs accomplish this by reading values from a multitude of sensors within the engine bay, interpreting the data using multidimensional performance maps (called look-up tables), and adjusting the engine actuators accordingly.

For an engine with fuel injection, the ECU determines the quantity of fuel to inject into the fuel chamber based on a number of parameters. For example, if the throttle position sensor is showing the throttle pedal is pressed further down, a mass flow sensor measures the amount of additional air being drawn into the engine and the ECU will inject a fixed quantity of fuel into the engine. If the engine's coolant temperature sensor is showing the engine has not warmed up yet, more fuel will be injected (causing the engine to run slightly 'rich' until the engine warms up). Mixture control on computer controlled carburetors works similarly, but with a mixture control solenoid or stepper motor incorporated in the float bowl of the carburetor.

A special category of ECUs are those which are programmable. These units do not have a fixed behavior and can be reprogrammed, typically by the user. Programmable ECUs are required where significant aftermarket modifications have been made to a vehicle's engine. Examples include adding or changing of a turbocharger, adding or changing of an intercooler, changing of the exhaust system or a conversion to run on alternative fuel. As a consequence of these changes, the old ECU may not provide appropriate control for the new configuration. In these situations, a programmable ECU can be incorporated into the engine's electrical system. These programmable ECUs are programmed/mapped with a laptop or external computer connected using a serial or USB cable, while the engine is running.

The programmable ECU may control the amount of fuel to be injected into each cylinder. This varies depending on the engine's RPM and the position of the accelerator pedal (or the manifold air pressure). The engine tuner can adjust this by bringing up a table on the external computer where each cell represents an intersection between a specific RPM value and an accelerator pedal position. Each cell has a value corresponding to the amount of fuel to be injected. This table is often referred to as a fuel table or fuel map.

By modifying these table values while monitoring the exhausts using a wide band lambda probe to see if the engine runs rich or lean, the tuner can find the optimal amount of fuel to inject to the engine at every different combination of RPM and throttle position. Other parameters that are often mappable are:

Ignition Timing: Defines at what point in the engine cycle the spark plug should fire for each cylinder.

Rev. limit: Defines the maximum RPM that the engine is allowed to reach.

Water temperature correction: Allows for additional fuel to be added when the engine is cold, such as in a winter cold-start scenario or when the engine is dangerously hot, to allow for additional cylinder cooling.

Transient fueling: Instructs the ECU to add a specific amount of fuel when throttle is applied ("acceleration enrichment").

Low fuel pressure modifier: Instructs the ECU to increase the injector fire time to compensate for an increase or loss of fuel pressure.

Closed loop lambda: Allows the ECU to monitor a permanently installed lambda probe and modify the fueling to achieve the targeted air/fuel ratio desired. This is often the stoichiometric (ideal) air fuel ratio, which on traditional petrol (gasoline) powered vehicles this air:fuel ratio is 14.7:1. This can also be a much richer ratio for when the engine is under high load, or possibly a leaner ratio for when the engine is operating under low load cruise conditions for maximum fuel efficiency.

Some of the more advanced standalone/race ECUs include functionality such as launch control, operating as a rev limiter while the car is at the starting line to keep the engine revs in a 'sweet spot', waiting for the clutch to be released to launch the car as quickly and efficiently as possible. Other examples of advanced functions are:

Wastegate control: Controls the behavior of a turbocharger's wastegate, controlling boost. This can be mapped to command a specific duty cycle on the valve, or can use a PID based closed-loop control algorithm.

Staged injection: Allows for an additional injector per cylinder, used to get a finer fuel injection control and atomization over a wide RPM range. An example being the use of small injectors for smooth idle and low load conditions, and a second, larger set of injectors that are 'staged in' at higher loads, such as when the turbo boost climbs above a set point.

Variable cam timing: Allows for control variable intake and exhaust cams (VVT), mapping the exact advance/retard curve positioning the camshafts for maximum benefit at all load/rpm positions in the map. This functionality is often used to optimize power output at high load/rpms, and to maximize fuel efficiency and emissions as lower loads/rpms.

Gear control: Tells the ECU to cut ignition during (sequential gearbox) upshifts or blip the throttle during downshifts.

A racing vehicle's ECU is often equipped with a data logger that records all sensors for later analysis using special software in a PC. This can be useful to track down engine stalls, misfires or other undesired behaviors during a race by downloading the log data and looking for anomalies after the event. In order to communicate with the driver, a race ECU can often be connected to a "data stack", which is a simple dash board presenting the driver with the current RPM, speed and other basic engine data. These race stacks, which are almost always digital, talk to the ECU using one of several proprietary protocols running over RS232 or CANbus, connecting to the DLC connector (Data Link Connector) usually located on the underside of the dash, inline with the steering wheel.

Presently, active tuning requires external computing power such as a laptop to reset the engine's values. Obviously, this process is inefficient and cannot meet the demands of high performance vehicles such as racing vehicles and performance sports cars. There are various companies in the market that cater to active tuning, including PCLink (www.linkecu.com) & EFILive (www.efilive.com), both of which require PCs or laptops that are separate from the vehicle to perform auto tuning for fuel tables. Other companies, such as Motec, use internal active tuning, but the market lacks a system and methodology for using internal (i.e., ECU) based active tuning on an OEM engine control unit.

SUMMARY OF THE INVENTION

The present invention is a self-contained process by which fuel tables and ignition tables can be updated in real time in the engine control unit, and where no external hardware (laptop etc) is needed. The internal active tuning tables are retained over many driving cycles, so high quality tables can be generated over time without any user input. Active tuning can be used for fuel & ignition tables, and potentially other secondary tables.

DETAILED DESCRIPTION OF THE PREFERRED EMBODIMENTS

Figure 1:
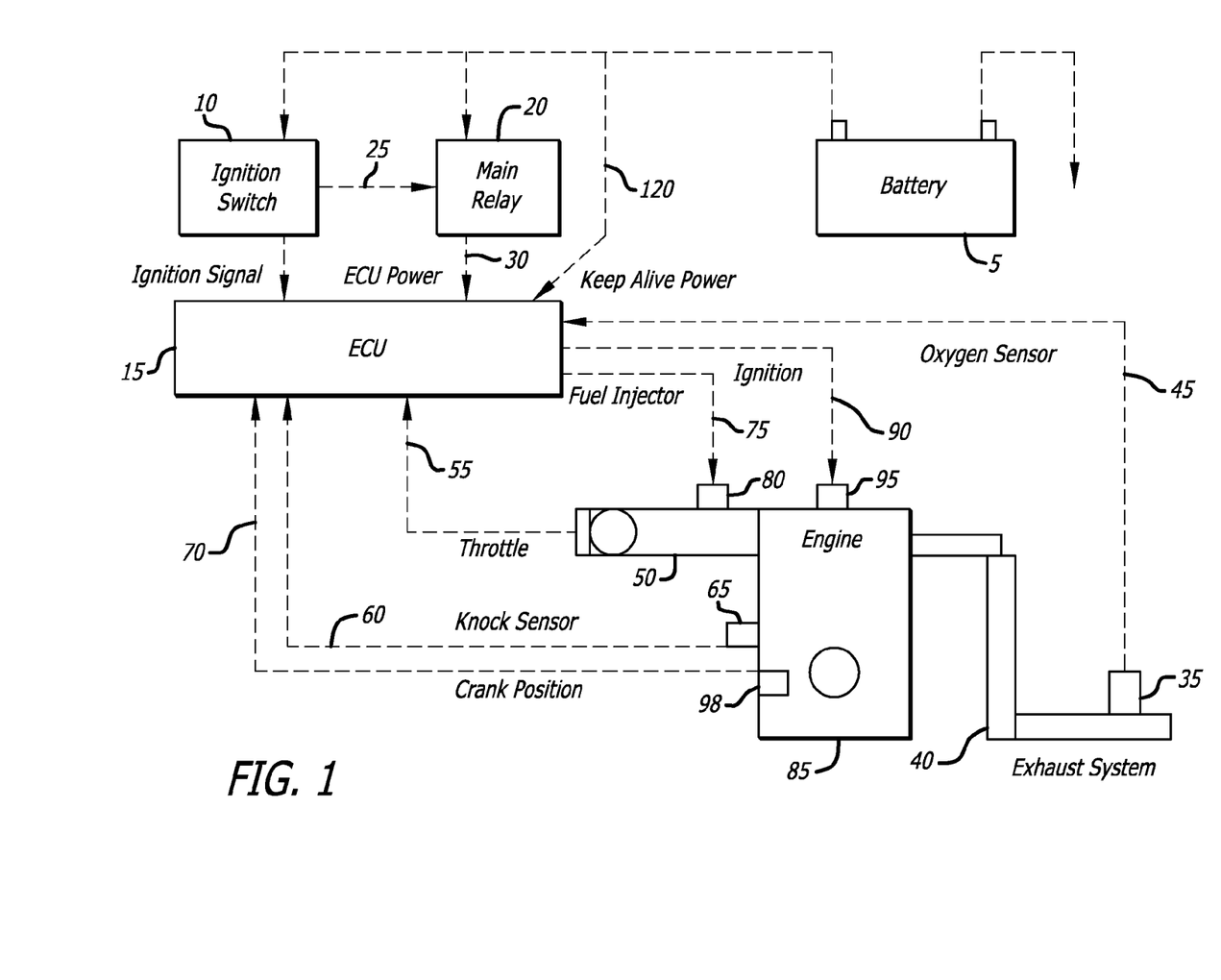
FIG. 1 is a schematic of an automobile engine control system.

FIG. 1 illustrates the components of an engine control system for a vehicle of the kind that can benefit from the present invention. The system begins with a power supply, such as the battery 5. The battery is connected to an ignition switch 10 that controls the power to the engine control unit 15, or "ECU." A main relay 20 receives an input signal 25 from the ignition switch 10, so as to operate the fuel pump, and supply power to the fuel injectors. In addition to the power via the ignition switch 10 and the signal 30 from the main relay 20, the ECU 15 also receives a signal 45 from an oxygen sensor 35 on the exhaust system 40, which provides feedback on the conditions of the fuel burning efficiency. The engine's throttle position is conveyed to the ECU 15 by a signal 55 from the engine's throttle 50. In preferred embodiments, the ECU also receives a signal 60 from an engine knock sensor 65 as well as a signal 70 of the engine's crank position via the crank position sensor 98. The output of the ECU is a signal 75 for instructions to the fuel injectors 80 on the engine 85, and the firing instructions 90 on the engine's spark plug 95. The system operates as a feedback loop, where each input controls the output and vice versa as the ECU attempts to maintain an optimal fuel burning system despite changing conditions inside and outside of the system.

To aid in the foregoing performance of the ECU, after market engine control units often include tables that are updatable, but this feature is not found on OEM ECUs. The OEM ECU in a vehicle uses fixed tables in flash memory to store engine operational data. These tables may be directly referenced by flash memory program code, or they can be referenced by a pointer to the table. Because flash memory takes considerable time to erase and re-flash, it cannot be altered while the ECU processor is running as the ECU operation will halt while the re-flashing task is underway. Random access memory, or RAM, on the other hand, is fast to update but is un-initialized when the power is removed from the ECU and therefore is cleared every driving cycle.

To enable rapid real time updating of the ECU's tables, the data may be copied from flash memory to RAM. To achieve this, an area of ECU RAM is reserved for a copy of the table. At startup, the ECU's code copies the data from its flash memory to RAM. All program code pointers to the table are updated to reference the table in RAM. In addition, a communication routine is added to the ECU that alters the RAM table based on commands received from external tuning software on a laptop. When the ECU is powered down and restarted, the ECU startup routine copies the original flash memory table into RAM so that all changes made to the RAM table are lost. To prevent this, the laptop can detect that the ECU has re-started and update the table automatically.

```
Pseudo code - ECU RAM initialization:

; On ECU startup
if ram location flag <> special value then
    ; Cold boot
    clear all RAM
    copy real time update tables from flash to RAM
    set ram location flag = special value
else
    ; Warm boot
    clear RAM outside our tables
end if
```

Figure 2:
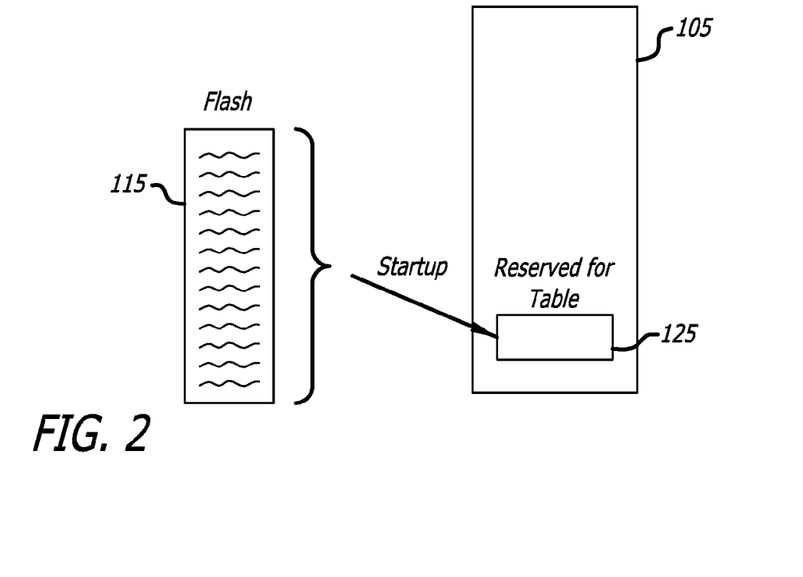
FIG. 2 is a schematic showing the flash and RAM memory.

Most ECUs 15 have battery backed up RAM 105 so that RAM contents such as the idle learn parameter are retained whilst the vehicle battery 5 is connected via connection 120. For real time tuning using processing internal to the ECU 15, the RAM table memory 125 contents need to be retained over multiple driving cycles in order to give satisfactory self-tuning results. Upon initialization, the ECU erases all RAM, and the real time tuning code copies tables from flash memory to RAM as described above. For active tuning, it is desirable to retain the contents of the RAM tables between driving cycles. In order to do this, the ECU initialization code is modified so that RAM tables are only copied from flash memory from a cold boot (vehicle battery has been disconnected) but not from a warm boot (ignition has been switched on).

Figure 3:
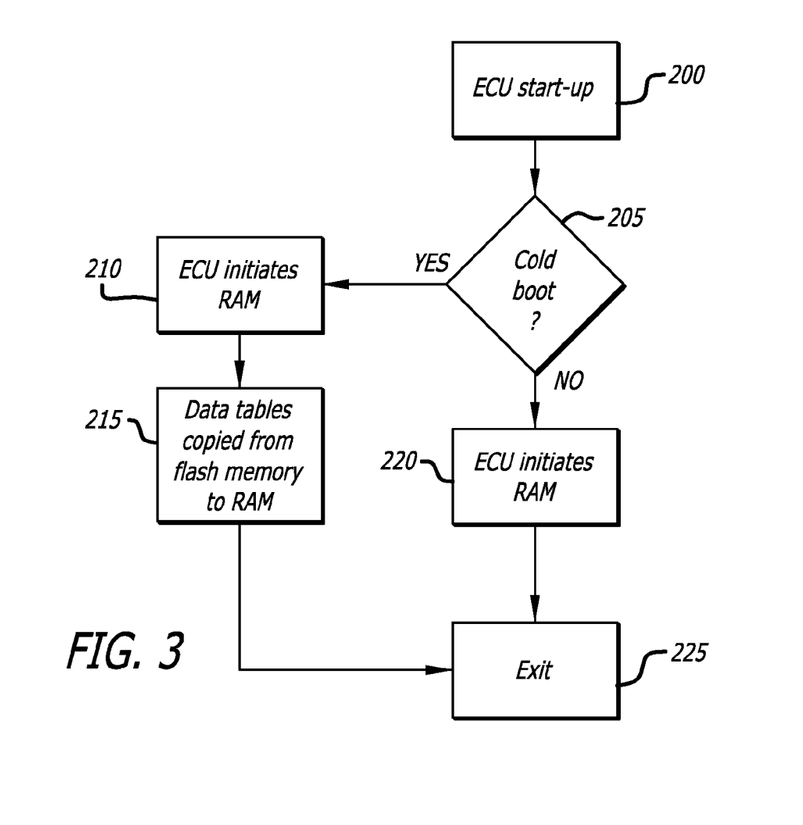
FIG. 3 is a flow chart showing the start-up method for the ECU.

FIG. 3 illustrates a flow chart of the initialization process in the start-up of the system. In box 200, the ECU start-up occurs followed by decision box 205 in which it is determined whether this was a cold boot or not. That is, whether the battery 5 of the vehicle has been disconnected or the ECU memory contents has been otherwise erased. If the start-up is from a cold boot, the processor initiates the RAM in box 210 and then copies the data tables from the flash memory to the RAM in box 215. If the start-up is not a cold boot, the processor initializes the RAM memory without copying the tables from flash memory in box 220, and then the program exits in box 225.

The state of the real time tables may be saved between tuning sessions by external tuning software running on a laptop. If a tuning session is suspended and then resumed, then the external software can determine that live tuning for a particular table is active, and sends commands to the ECU to set the RAM table values without needing to re-write the whole ECU flash memory. This process takes a fraction of a second compared to minutes to re-write the ECU flash memory.

When using an ECU with real time tuning (as with the above method or any other method that allows the ECU memory to be altered whilst the ECU is running) and while using feedback from a wideband lambda sensor, the ECU fuel table with rpm and engine load indexes containing ignition timing adjustment values used to trim the ignition timing. The reference_engine_noise table below contains typical knock sensor noise value when engine knock is not occurring.

| kPa | 20 | 29 | 40 | 51 | 63 | 74 | 86 | 97 | 131 | 131 | 135 | 138 | 142 | 156 | 169 |
|---|---|---|---|---|---|---|---|---|---|---|---|---|---|---|---|
| 500 | 22.4 | 22.4 | 23.4 | 23.4 | 24.4 | 24.4 | 24.4 | 25.4 | 25.4 | 25.4 | 25.4 | 25.4 | 25.4 | 25.4 | 25.4 |
| 1000 | 22.4 | 22.4 | 23.4 | 23.4 | 24.4 | 24.4 | 24.4 | 25.4 | 25.4 | 25.4 | 25.4 | 25.4 | 25.4 | 25.4 | 25.4 |
| 1250 | 23.7 | 23.7 | 24.7 | 24.7 | 25.7 | 25.7 | 25.7 | 26.7 | 26.7 | 26.7 | 26.7 | 26.7 | 26.7 | 26.7 | 26.7 |
| 1500 | 25.9 | 25.9 | 26.9 | 26.9 | 27.9 | 27.9 | 27.5 | 28.9 | 28.9 | 28.9 | 28.9 | 28.9 | 28.9 | 28.9 | 28.9 |
| 1750 | 28.3 | 28.3 | 29.3 | 29.3 | 30.3 | 30.3 | 30.3 | 31.3 | 31.3 | 31.3 | 31.3 | 31.3 | 31.3 | 31.3 | 31.3 |
| 2000 | 29.4 | 29.4 | 30.4 | 30.4 | 31.4 | 31.4 | 35.0 | 36.0 | 35.0 | 32.4 | 32.4 | 32.4 | 32.4 | 32.4 | 32.4 |
| 2250 | 33.0 | 33.0 | 34.0 | 34.0 | 35.0 | 35.0 | 40.9 | 41.9 | 41.9 | 36.0 | 36.0 | 35.0 | 36.0 | 38.0 | 36.0 |
| 2500 | 38.9 | 38.9 | 39.9 | 39.9 | 40.9 | 40.9 | 46.8 | 47.8 | 47.8 | 41.9 | 41.9 | 41.9 | 41.9 | 41.9 | 41.9 |
| 3000 | 48.3 | 48.3 | 43.3 | 49.3 | 50.3 | 50.3 | 63.3 | 64.3 | 64.3 | 51.3 | 51.3 | 51.3 | 51.3 | 51.3 | 51.3 |
| 3500 | 61.3 | 61.3 | 62.3 | 62.3 | 63.3 | 63.3 | 76.2 | 77.2 | 77.2 | 64.3 | 64.3 | 64.3 | 64.3 | 64.3 | 64.3 |
| 3750 | 56.5 | 56.5 | 57.5 | 57.5 | 58.5 | 58.5 | 68.1 | 69.1 | 69.1 | 59.5 | 59.5 | 69.5 | 59.5 | 59.5 | 59.5 |
| 4000 | 59.8 | 59.8 | 60.8 | 60.6 | 61.8 | 61.8 | 66.5 | 67.5 | 67.5 | 62.8 | 62.6 | 62.8 | 62.8 | 62.8 | 62.8 |
| 4250 | 56.6 | 56.6 | 57.6 | 57.6 | 58.6 | 58.6 | 67.6 | 68.6 | 66.6 | 59.6 | 59.6 | 59.6 | 59.6 | 59.6 | 59.6 |
| 4500 | 56.3 | 56.3 | 57.3 | 57.3 | 58.3 | 58.3 | 66.2 | 67.2 | 67.2 | 59.3 | 59.3 | 59.3 | 59.3 | 59.3 | 59.3 |
| 5000 | 45.9 | 45.9 | 46.9 | 48.9 | 47.9 | 47.9 | 54.2 | 55.2 | 55.2 | 48.9 | 48.9 | 43.9 | 46.9 | 48.9 | 48.9 |
| 5500 | 41.0 | 41.0 | 42.0 | 42.0 | 43.0 | 43.0 | 48.9 | 49.9 | 49.9 | 44.0 | 44.0 | 44.0 | 44.0 | 44.0 | 44.0 |
| 6000 | 37.6 | 37.6 | 38.6 | 38.6 | 39.6 | 39.6 | 45.0 | 46.0 | 46.0 | 40.6 | 40.6 | 40.6 | 40.6 | 40.6 | 40.6 |
| 7000 | 61.8 | 61.8 | 62.8 | 62.6 | 63.8 | 63.8 | 63.8 | 64.6 | 64.8 | 64.8 | 64.8 | 64.8 | 64.8 | 64.8 | 64.8 |
| 8000 | 79.4 | 79.4 | 80.4 | 80.4 | 81.4 | 81.4 | 81.4 | 82.4 | 82.4 | 82.4 | 82.4 | 82.4 | 82.4 | 82.4 | 82.4 |
| 9000 | 90.1 | 90.1 | 91.1 | 91.1 | 92.1 | 92.1 | 92.1 | 93.1 | 93.1 | 93.1 | 93.1 | 93.1 | 93.1 | 93.1 | 93.1 | tables using the present invention can be altered by software in a closed feedback loop to bring the ECU fuel tables closer to optimum. The software uses parameters to determine when fuel table changes should be made, such as engine conditions (like temperature, throttle setting), lambda parameters (minimum & maximum readings to consider) and dynamic parameters (delay after engine events etc). A copy of the base fuel table is kept so that a maximum change in the fuel table can be specified. Additional parameters determine how often changes should be made, and what closed loop strategy is used (e.g., PID algorithms), and what table smoothing algorithm should be used.

As set forth above, the fuel table is a matrix of discrete fuel values. Engine parameters are scalar values that index each axis (two to three axes or more). Because the fuel table has discrete values, an algorithm must be used to determine which cell or cells should be altered. Options include: a) closest cell, where the closest matching fuel table cell to the indexes is altered; b) weighted cell, where the four closest cells (or eight cells for three axis tables) are altered by proportion of the cell midpoint to the index scalar value; and c) precise cell, where the software only changes a cell when the index values are close to the center of the cell.

In addition, all modern ECUs 15 have a knock sensor 65 and associated processing circuitry, that use engine noise processing to determine if engine knock is occurring, and optionally how close the engine 85 might be to engine knock. An additional ignition trim table may be created that allows the main ignition tables to be altered in order to minimize engine knock where knock occurs, and optionally increase engine timing when conditions allow it. Also, there are multiple algorithms available for tuning ignition tables: a) retard on knock, when the ignition is reduced in a cell by a fixed amount when there is knock present; b) adaptive retard when the ignition is also advanced back in a cell if no knock occurs; and c) noise based timing when the knock sensor noise (rather than the presence of knock) is used to trim ignition timing.

The active knock control routines are typically executed in a timer interrupt at a fixed frequency, such as 100 Hz. The active_knock_adjustment table is a 2 or more axes lookup To employ a knock count method into the active ignition tuning, a pseudo code such as the following can be used:

```
set step_size = user setting for knock retard step
calculate rpm & load indexes for table lookup
read knock_adjustment_value from active_knock_adjustment table
set knock_count = sum of all cylinder knock count
if knock_count <> previous_knock_count then
    previous_knock_count = knock_count
    set new_knock_adjustment_value = knock_adjustment_value +
    step_size
    if new_knock_adjustment_value <
    settings_maximum_knock_adjustment then
        update active_knock_adjustment table value with
        new_knock_adjustment_value
    end if
else if using adaptive knock control method then
    set new_knock_adjustment_value = knock_adjustment_value -
    step_size
    if new_knock_adjustment_value >
    settings_minimum_knock_adjustment then
        update active_knock_adjustment table value with
        new_knock_adjustment_value
    end if
end if
```

Figure 4:
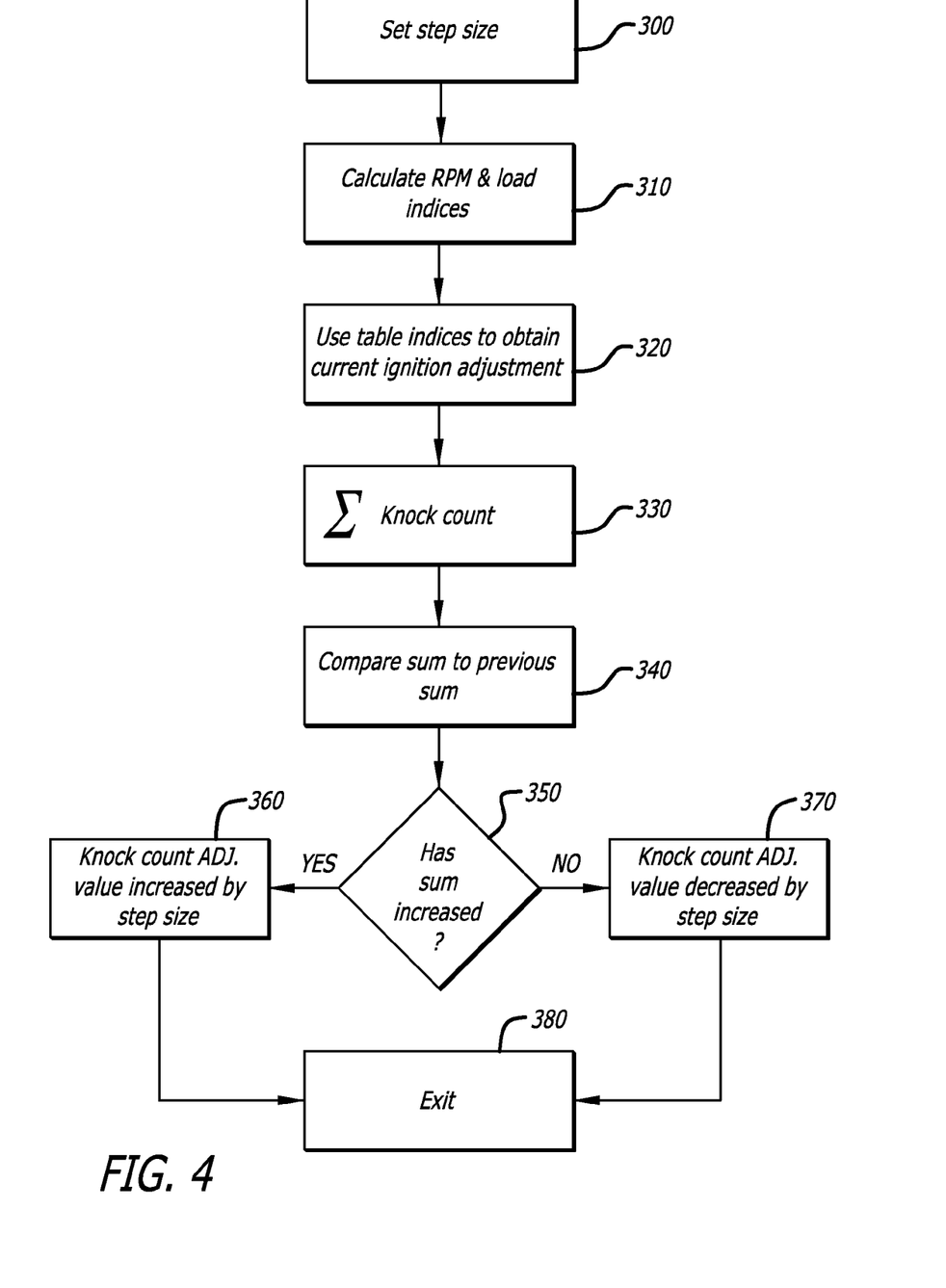
FIG. 4 is a flow chart for adjusting the active tuning using a knock count.

In the pseudo code above (see FIG. 4), the step size is set to the value for the ignition retard when knock is detected in the engine in step 300. In the following step 310, a subroutine (discussed below) calculates the table indices using the table index values, typically rpm and load, The current ignition adjustment value is read in step 320 from the knock adjustment table using the table indexes. The program in step 330 sums the knock count for each cylinder, and compares the result with the previous knock count sum in step 340. If the knock count has increased in step 350, then the knock count adjustment value is increased by the step size up to the maximum knock adjustment value in step 360. If an adaptive knock method is used and there is no knock, then the knock adjustment value is decreased by the step size in step 370, where the adjustment value is limited by a minimum knock adjustment value, whereupon the program exits in step 380.

Alternatively, the active tuning can be used with a knock level method as well:

```
set knock_noise = knock sensor noise
calculate rpm & load indexes for table lookup
read knock_adjustment_value from active_knock_adjustment table
read reference_engine_noise_value from reference_engine_noise table
set adjustment = (knock_noise − reference_engine_noise_value) *
adjustment factor
set new_knock_adjustment_value = knock_adjustment_value +
adjustment
if new_knock_adjustment_value < maximum_knock_adjustment and
new_knock_adjustment_value > minimum_knock_adjustment then
    update active_knock_adjustment table value with
    new_knock_adjustment_value
end if
```

Figure 5:
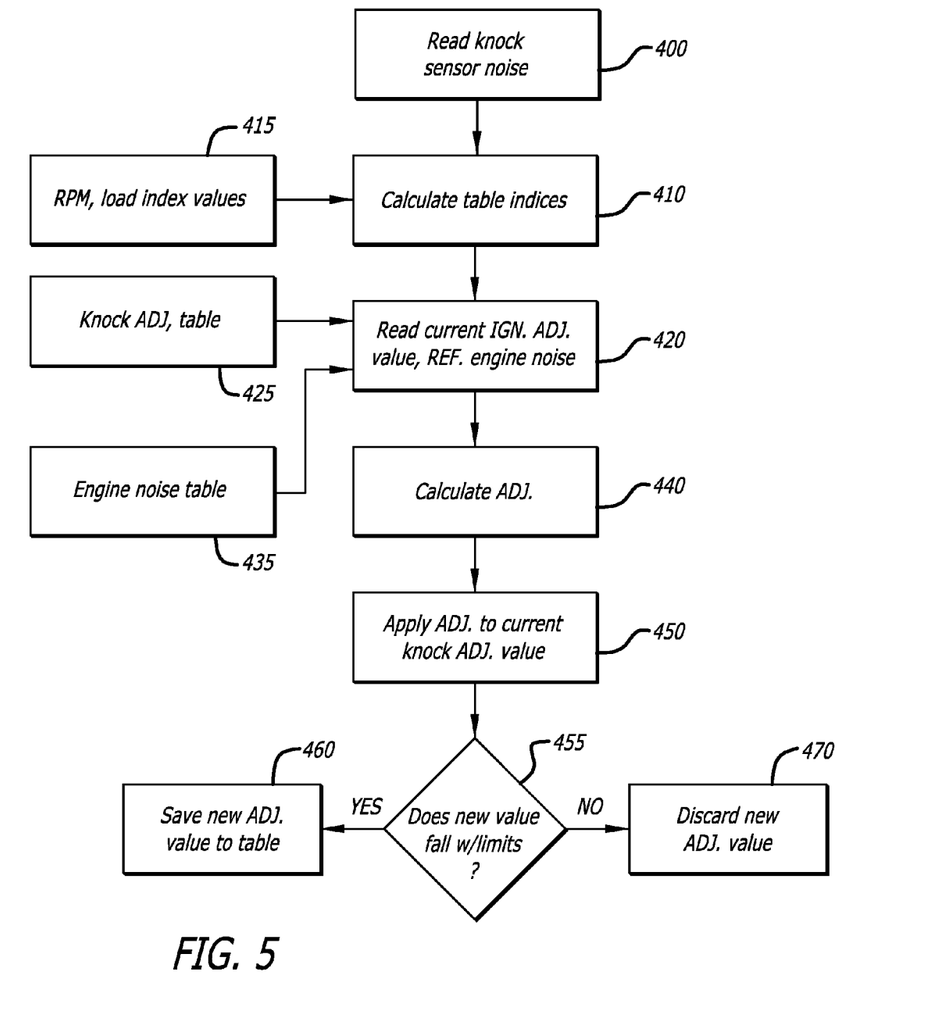
FIG. 5 is a flow chart for adjusting the knock count adjustment value.

In the above code sequence, referring to the flow chart of FIG. 5, the knock sensor noise is read in step 400, and the table indexes are calculated in step 410 using the table index values 415, typically rpm and load. The current ignition adjustment value is read in step 420 from the knock adjustment table 425 using the table indexes, and the reference engine noise is also obtained from the engine noise table 435 using the table indexes. An adjustment is calculated in step 440 from the difference between the reference noise and the knock sensor noise multiplied by the adjustment factor, and the adjustment is applied to the current knock adjustment value in step 450. A comparison of the new value is made in step 455, and if the new knock adjustment value falls within valid predefined adjustment value limits, then the adjustment value is saved to the table in step 460. Otherwise, the new value is discarded in step 470.

The table below illustrates an example of an ignition adjustment matrix after driving:

| kPa | 12 | 20 | 29 | 40 | 51 | 63 | 74 | 86 | 97 | 103 | 115 | 128 | 142 | 156 | 169 |
|---|---|---|---|---|---|---|---|---|---|---|---|---|---|---|---|
| 500 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 800 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 1000 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 1250 | 0.0 | 0.0 | 0.0 | 0.0 | 0.0 | 0.0 | 0.4 | 0.3 | 0.0 | 0.0 | 0.0 | 0.0 | 0.0 | 0.0 | 0.0 |
| 1500 | 0.0 | 0.0 | 0.0 | 0.0 | 0.0 | 0.0 | 0.6 | 0.6 | 0.0 | 0.0 | 0.0 | 0.0 | 0.0 | 0.0 | 0.0 |
| 1750 | 0.0 | 0.0 | 0.0 | 0.0 | 0.0 | 0.0 | 0.6 | 0.7 | 0.0 | 0.0 | 0.0 | 0.0 | 0.0 | 0.0 | 0.0 |
| 2000 | 0.0 | 0.0 | 0.0 | 0.0 | 0.0 | 0.0 | 0.8 | 0.8 | 0.0 | 0.0 | 0.0 | 0.0 | 0.0 | 0.0 | 0.0 |
| 2250 | 0.0 | 0.0 | 0.0 | 0.0 | 0.0 | 0.0 | 0.8 | 1.1 | 1.3 | 1.0 | 0.3 | 0.0 | 0.0 | 0.0 | 0.0 |
| 2500 | 0.0 | 0.0 | 0.0 | 0.0 | 0.0 | 0.0 | 0.8 | 2.4 | 3.4 | 0.9 | 0.3 | 0.0 | 0.0 | 0.0 | 0.0 |
| 2750 | 0.0 | 0.0 | 0.0 | 0.0 | 0.0 | 0.0 | 0.8 | 1.0 | 1.0 | 0.8 | 0.3 | 0.0 | 0.0 | 0.0 | 0.0 |
| 3000 | 0.0 | 0.0 | 0.0 | 0.0 | 0.0 | 0.0 | 0.8 | 3.4 | 0.8 | 0.7 | 0.2 | 0.0 | 0.0 | 0.0 | 0.0 |
| 3500 | 0.0 | 0.0 | 0.0 | 0.0 | 0.0 | 0.0 | 0.6 | 0.8 | 0.7 | 0.6 | 0.2 | 0.0 | 0.0 | 0.0 | 0.0 |
| 4000 | 0.0 | 0.0 | 0.0 | 0.0 | 0.0 | 0.0 | 0.3 | 0.2 | 0.2 | 3.0 | 0.1 | 0.0 | 0.0 | 0.0 | 0.0 |
| 4500 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 5000 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 5500 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 5800 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 6000 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 7000 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| 8100 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

To modify the fuel tables using the ECU alone, a closed loop feedback routine is established. All moderns ECU use a wideband type oxygen sensor that reads the exhaust lambda ratio. Analyzing this sensor can be used to trim the fuel tables using a closed loop feedback routine. The first step is establishing a target lambda, which is typically the stoichiometric ratio (lambda=1) for light and moderate load areas, which enrichment high load and cold operating temperatures. A sample target lambda table is set forth below:

| | Col | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| kPa | 12 | 20 | 29 | 40 | 51 | 63 | 74 | 86 | 97 | 103 | 115 | 128 |
| 500 | 14.70 | 14.70 | 14.70 | 14.70 | 14.70 | 14.70 | 14.70 | 13.84 | 13.44 | 13.25 | 12.89 | 12.71 |
| 800 | 14.70 | 14.70 | 14.70 | 14.70 | 14.70 | 14.70 | 14.70 | 13.84 | 13.44 | 13.25 | 12.89 | 12.71 |
| 1000 | 14.70 | 14.70 | 14.70 | 14.70 | 14.70 | 14.70 | 14.70 | 13.84 | 13.44 | 13.25 | 12.89 | 12.71 |
| 1250 | 14.70 | 14.70 | 14.70 | 14.70 | 14.70 | 14.70 | 14.70 | 13.84 | 13.44 | 13.25 | 12.89 | 12.71 |
| 1500 | 14.70 | 14.70 | 14.70 | 14.70 | 14.70 | 14.70 | 14.70 | 13.84 | 13.44 | 13.25 | 12.89 | 12.71 |
| 1750 | 14.70 | 14.70 | 14.70 | 14.70 | 14.70 | 14.70 | 14.70 | 13.84 | 13.44 | 13.25 | 12.89 | 12.71 |
| 2000 | 14.70 | 14.70 | 14.70 | 14.70 | 14.70 | 14.70 | 14.70 | 13.84 | 13.44 | 13.25 | 12.89 | 12.71 |
| 2250 | 14.70 | 14.70 | 14.70 | 14.70 | 14.70 | 14.70 | 14.70 | 13.84 | 13.44 | 13.25 | 12.89 | 12.71 |
| 2500 | 14.70 | 14.70 | 14.70 | 14.70 | 14.70 | 14.70 | 14.70 | 13.84 | 13.44 | 13.25 | 12.89 | 12.71 |
| 2750 | 14.70 | 14.70 | 14.70 | 14.70 | 14.70 | 14.70 | 14.70 | 13.84 | 13.44 | 13.25 | 12.89 | 12.71 |
| 3000 | 14.70 | 14.70 | 14.70 | 14.70 | 14.70 | 14.70 | 14.70 | 13.84 | 13.44 | 13.25 | 12.89 | 12.71 |
| 3500 | 14.70 | 14.70 | 14.70 | 14.70 | 14.70 | 14.70 | 14.70 | 13.84 | 13.44 | 13.25 | 12.89 | 12.71 |
| 4000 | 14.70 | 14.70 | 14.70 | 14.70 | 14.70 | 14.70 | 14.70 | 13.84 | 13.44 | 13.25 | 12.89 | 12.71 |
| 4500 | 14.70 | 14.70 | 14.70 | 14.70 | 14.70 | 14.70 | 14.70 | 13.84 | 13.44 | 13.25 | 12.89 | 12.71 |
| 5000 | 14.70 | 14.70 | 14.70 | 14.70 | 14.70 | 14.70 | 14.70 | 13.84 | 13.44 | 13.25 | 12.89 | 12.71 |

-continued

|  | Col | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| kPa | 12 | 20 | 29 | 40 | 51 | 63 | 74 | 86 | 97 | 103 | 115 | 128 |
| 5500 | 14.70 | 14.70 | 14.70 | 14.70 | 14.70 | 14.70 | 14.70 | 13.84 | 13.44 | 13.25 | 12.89 | 12.71 |
| 5800 | 14.70 | 14.70 | 14.70 | 14.70 | 14.70 | 14.70 | 14.70 | 13.84 | 13.44 | 13.25 | 12.89 | 12.71 |
| 6000 | 14.70 | 14.70 | 14.70 | 14.70 | 14.70 | 14.70 | 14.70 | 13.84 | 13.44 | 13.25 | 12.89 | 12.71 |
| 7000 | 14.70 | 14.70 | 14.70 | 14.70 | 14.70 | 14.70 | 14.70 | 13.84 | 13.44 | 13.25 | 12.89 | 12.71 |

The parameters used to control fuel active tuning are:
a. operational area (closed loop and/or open loop)
b. operational conditions (temperature, load, engine speed, gear etc)
c. operation limits (maximum trim)
d. correction methods (using existing ECU fuel trims)
e. transitional delays (engine start delay, injector restart delay)
f. sensor processing (sensor correction, lambda reading delay)

Figure 6:
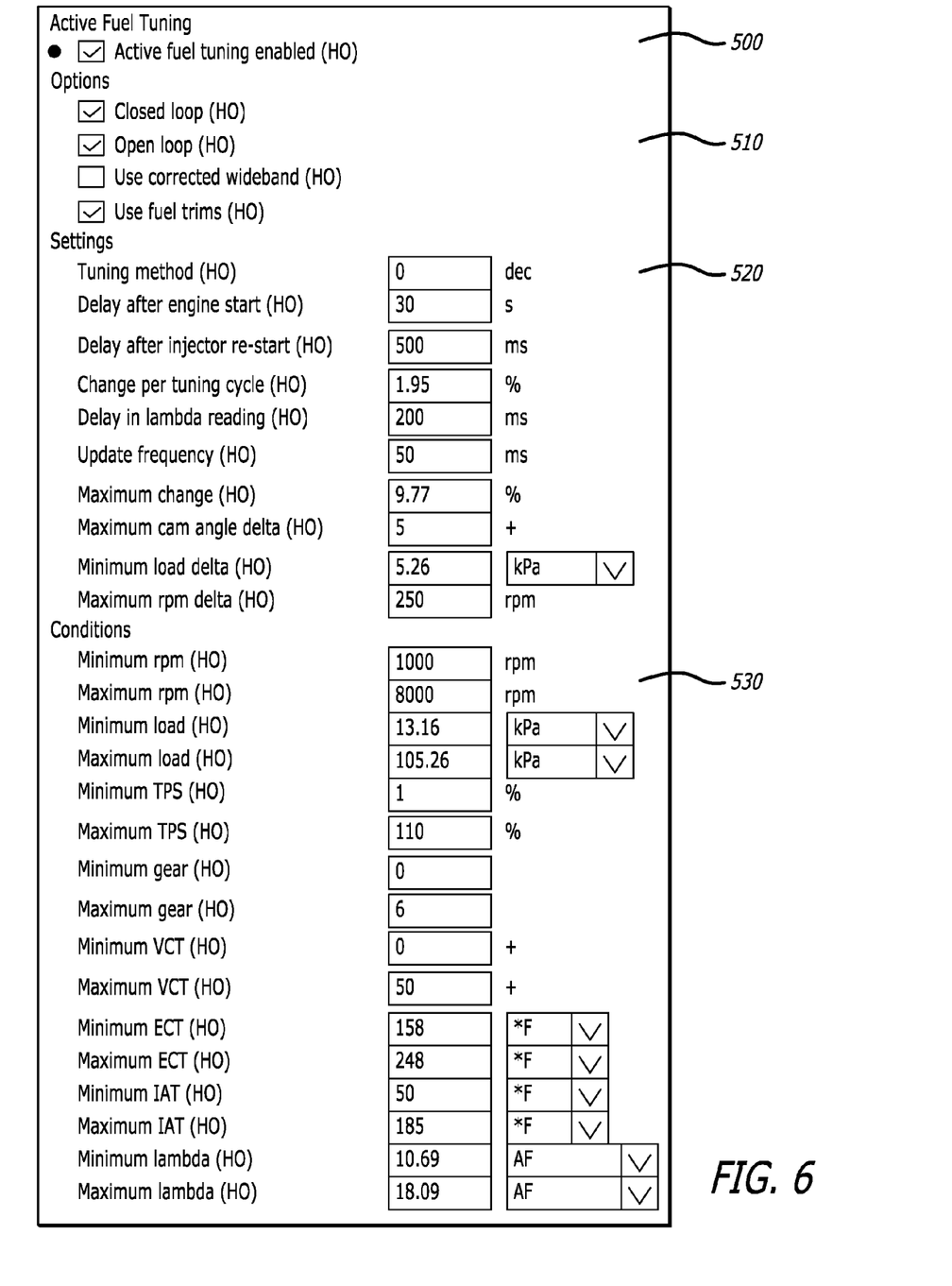
FIG. 6 is a computer interface entry table for adjusting the active tuning.
Figure 7:
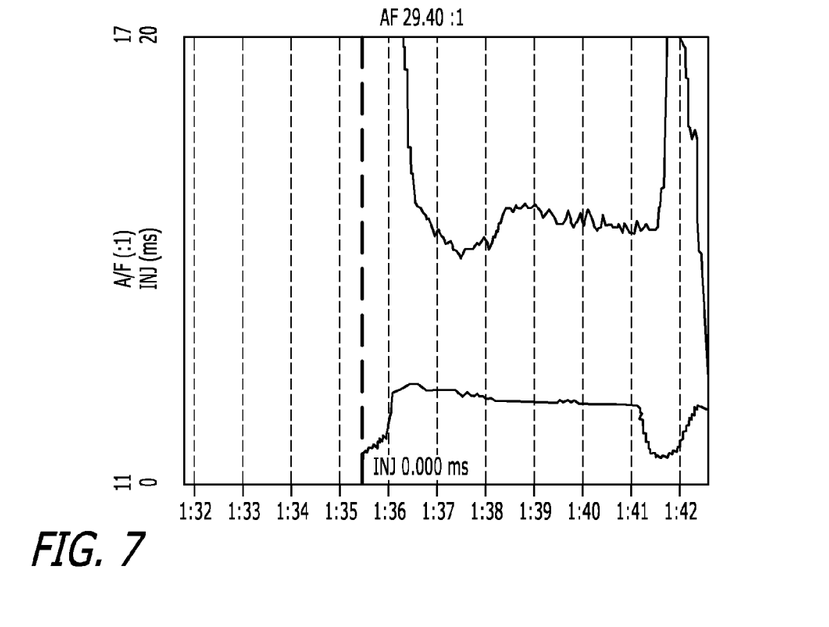
FIG. 7 is a graph showing the delay in the lambda in response to a change in engine conditions.

FIG. 6 illustrates an interface template that can be used to adjust the active tuning. The first box 500 is checked by the user when the active tuning is enabled. Below the activation box is an options group 510 that allows for open loop, closed loop, use corrected for wideband, and use fuel trim. Each option has a box that can be checked by the user. Below the options group 510 is a settings group 520, that require values to be input such as tuning method, delay after engine start, delay after injector re-start, change per tuning cycle, delay in lambda reading, update frequency, maximum change, maximum cam angle delta, maximum load delta, and maximum rpm delta. These user settings allow the program to operate under specified conditions and parameters. Below the settings group 520 is a conditions group 530, that includes rpm, load, TPS, VTC, ECT, IAT, and min/max lambda values. It should be noted that the lambda as read by the lambda sensor is not accurate for a short period after the fuel injectors, re-start after being shut-off, so a configurable delay is included to prevent the active tuning process until the engine lambda reading has stabilized. This can be seen by the chart in FIG. 7 illustrating the delay after the fuel injectors restart before the lambda sensors recognize the event.

Figure 8:
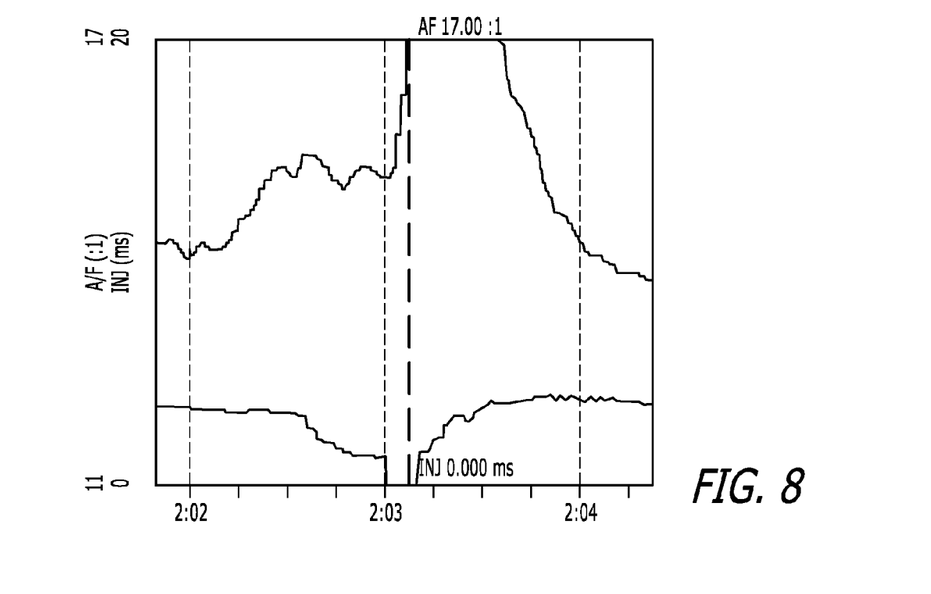
FIG. 8 is a graph showing the delay in lambda due to the sensor being downstream of the engine.

FIG. 8 illustrates a graph in which the lambda sensor is delayed from the actual lambda due to the lambda sensor being in the exhaust system, downstream from the engine, and the system delay of the lambda sensor controller. This delay can be estimated by observing the time difference between engine events that result in a change of lambda and the change in lambda. For example, one method is to measure the time between injector shut off and the lambda reading changing.

To compensate for the delay in lambda reading when the ECU is in active tuning, a circular buffer is kept containing engine conditions used to index changes to the fuel adjustment table (rpm, load, cam position etc). When active tuning changes are made, the historical engine conditions are then used to determine where the fuel tuning adjustment should be made. The active fuel tuning routines are typically executed in a timer interrupt at a fixed frequency, such as 100 Hz.

When using a circular buffer routine, active tuning can be accomplished by the following pseudo code:

```
; Implements a circular delay buffer for engine conditions to compensate
; for oxygen sensor delay
set old_rec_no = engine_rec_ptr + 1
; The size of the circular array is the minimum of the maximum size and
; the delay setting (at 100Hz the units are 10ms)
set end_engine_rec_no = maximum buffer size
if end_engine_rec_no > setting_lambda_delay then
    end_engine_rec_no = setting_lambda_delay
end if
; Cope with circular buffer rolling over
if old_rec_no = end_engine_rec_no then
    old_rec_no = 0
end if
get engine conditions record using index old_rec_no
call active fuel tuning conditions checking routine (below)
; Update circular buffer of engine conditions
save engine conditions record at index engine_rec_ptr
set engine_rec_ptr = engine_rec_ptr + 1
if engine_rec_ptr = end_engine_rec_no then
    engine_rec_ptr = 0
end if
```

Figure 9:
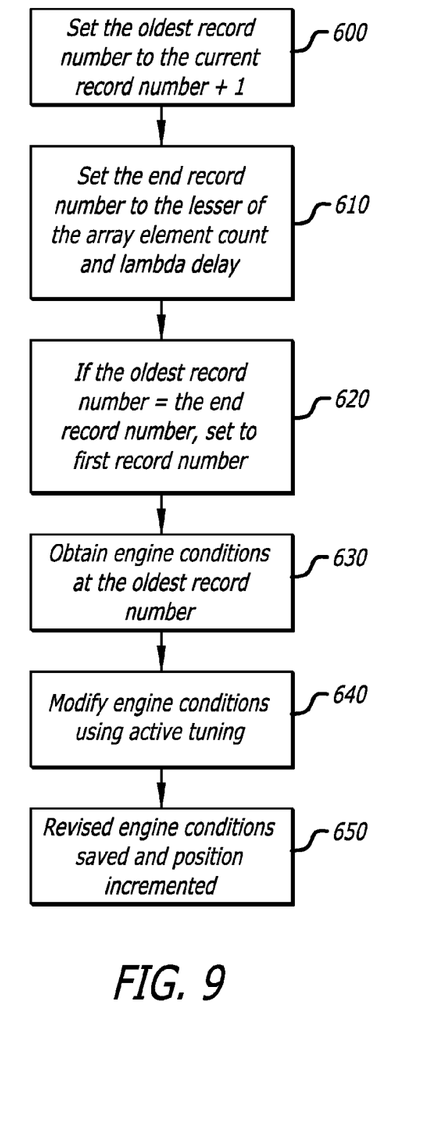
FIG. 9 is a flow chart for setting the engine conditions using the active tuning.

In the foregoing code, an array of engine conditions are created in a memory, such as rpm, load, cam position, and the like obtained at a fixed frequency (100 Hz). Referring to FIG. 9, the oldest record number is set to the current record number in step 600, and the end record number is set to the lesser of the array element count and the lambda delay in step 610. If the old record number equals the end record number, then the buffer has rolled over so the old record number is set to the first element of the array in step 620. Then the engine conditions are set from the record for the array at the old record position in step 630. The subroutine set forth below is then run for active tuning in step 650. The current engine conditions are saved to the array at the current record position and the current record position is incremented by one in step 660. If the current record position has reached the end record number, then set the current record position to the first element of the array.

Similarly, active fuel tuning conditions using a checking routine:

```
set tps = throttle position
set vtc = intake camshaft position
set tps_ok = tps > setting_min_tps and tps < setting_max_tps
set vtc_ok = vtc > setting_min_vtc and vtc < setting_max_vtc
set engine _fuel_cut when injector are shut off
; Start a delay counter if the injectors are off, or the tps
; or cam angle is out of range
if engine _fuel_cut or not tps_ok or not vtc_ok then
```

```
    set injector_delay_counter = setting_fuel_restart_delay
else if injector_delay_counter > 0 then
    set injector_delay_counter = injector_delay_counter − 1
else
    ; Table update frequency
    if active_tuning_counter > 0 then
        set active_tuning_counter = active_tuning_counter − 1
    else
        ; Check engine conditions
        set load_ok = load > settings_min_load and load < settings_max_load
        set rpm_ok = rpm > settings_min_rpm and rpm < settings_max_rpm
        set ect_ok = ect > settings_ min_ect and ect < settings_max_ect
        set iat_ok = iat > settings_min_iat and iat < settings_max_iat
        set gear_ok = gear > settings_min_gear and gear < settings_max_gear
        set time_ok = engine running time > settings_min_engine_run_time
        if engine is in closed loop then
            set cl_ok = setting_active_closed_loop
        else
            set cl_ok = setting_active_in_open_loop
        end if
        set lambda_ok = lambda > settings_min_lambda and lambda < settings_max_lambda
        if load_ok and rpm_ok and ect_ok and iat_ok and gear_ok and time_ok and cl_ok and
        lambda_ok then
            call active fuel tuning update adjustment table routine (below)
        end if
        ; Set the cycle delay counter
        set active_tuning_counter = settings active fuel update frequency
    end if
end if
```

Figure 10:
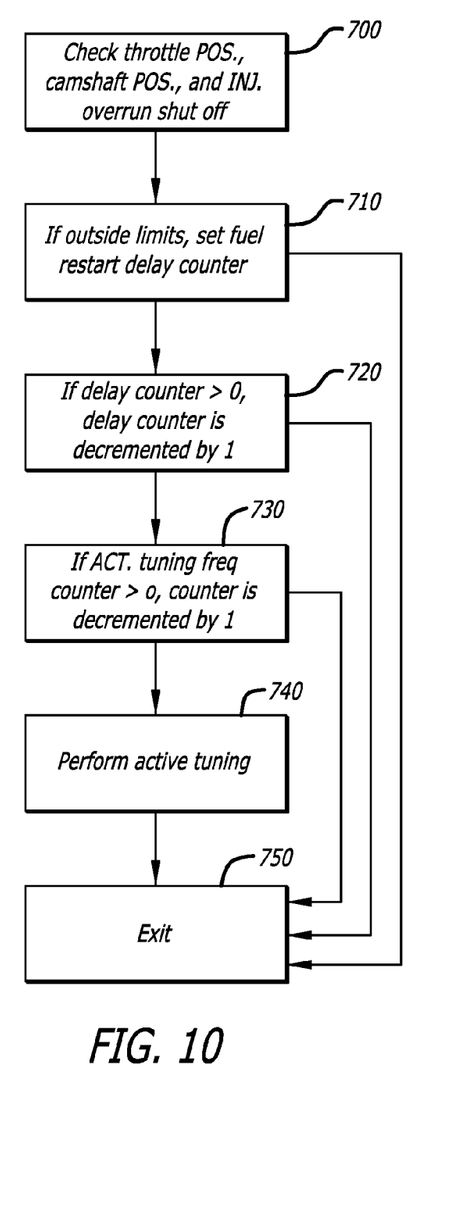
FIG. 10 is a flow chart for checking the engine condition parameters are within limits.

In this code sequence, illustrated by the flow chart of FIG. 10, throttle position, the camshaft position, and the injector overrun shut off are all checked to make sure they are within acceptable limits in step 700. If not, a delay counter is set to the setting for the fuel restart delay in step 710 and the routine is exited in step 750. If the delay counter is greater than zero, then the delay counter is decremented in step 720 and the routine is exited. If the active tuning frequency counter is greater than zero, then the active tuning frequency counter is decremented in step 730 and the routine is exited. If load, rpm, ect, iat, gear, after start delay, closed loop & lambda are within the established range, then the routine below is performed in step 740 and the active tuning frequency counter is set to the setting for tuning frequency.

The active fuel tuning can also update the adjustment table using pseudo code:

```
; Find target lambda
read target_af from target_af_table
; Adjust target lambda for closed loop operation (short & long term trims)
if settings_use_fuel_trims then
    set adjustment = − (short_term_fuel_trim + long_term_fuel_trim)
    set target_af = target_af * adjustment
end if
; Find adjustment table indexes
call find closest table indexes (below)
; Check the delta cam, load & rpm and within range
if cam_angle_delta < settings_max_delta_cam and rpm_delta < settings_max_rpm_delta and
load_delta < settings_max_load_delta then
    ; Calculate adjustment
    read current lambda adjustment value from table
    if lambda < target_af then
        ; Lean
        set delta_lambda = target_af − lambda
        set adjustment = delta_lambda * fuel change per cycle
        set new_value = value + adjustment
        if new_value > settings_max_delta then
            new_value = settings_max_delta
        end if
    else
        ; Rich
        set delta_lambda = lambda − target_af
        set adjustment = delta_lambda * fuel change per cycle
        set new_value = value − adjustment
        if new_value < settings_min_delta then
            new_value = settings_min_delta
        end if
    end if
    update lambda adjustment table value with new_value
end if
```

Figure 11:
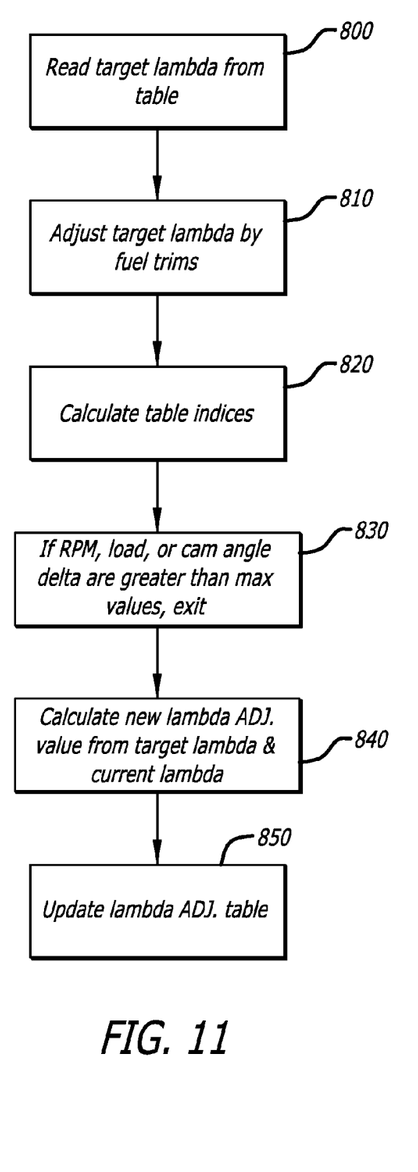
FIG. 11 is a flow chart for adjusting the target lambda adjustment value.

In the preceding routine, the target lambda is read from the target lambda table in step 800 of FIG. 11. If the setting to use fuel trims is set, then the target lambda is adjusted by the short and long term fuel trims in step 810. Using the routine below, is within the setting for maximum adjustment, then the lambda adjustment table is updated with the new value in step 850.

Figure 12:
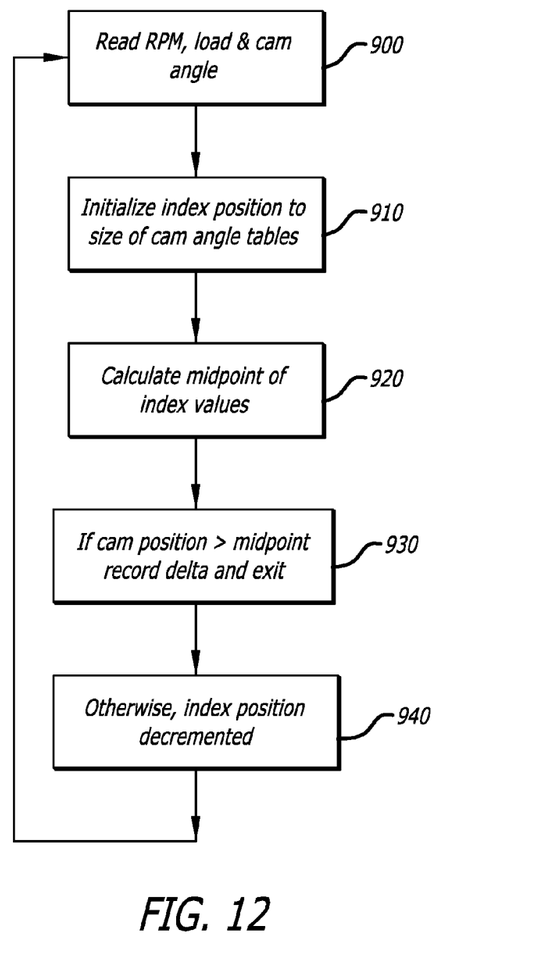
FIG. 12 is a flow chart for calculating the midpoint of the index values.

To find the closest table index, the following code is used:

```
; Find closest cam angle index
; cam_index_lookup is the table lookup scalar index
if no vtc then
    ; use first cam angle table
    set cam_index = 0
    set cam_angle_delta = 0
else
    set cam = engine intake camshaft advance angle
    set cam_index = number of cam angle tables − 1
    set cam_delta = 0
    while index > 0
        set mid_point = (cam_index_lookup[cam_index] + cam_index_lookup [cam_index −
            1]) / 2
        set cam_angle_delta = cam − cam_index_lookup[cam_index − 1]
        if cam > mid_point then
            set cam_angle_delta = cam_index_lookup[cam_index] − cam
            exit while loop
        end if
        set cam_index = cam_index − 1
    end while
    if cam_delta < 0 then
        set cam_delta = − cam_delta
    end if
end if
;
; Find closest rpm and load indexes
; rpm_index_lookup and load_index_lookup are the table lookup scalar indexes
;
; Rpm
set rpm_index = rpm_index_lookup size − 1
set rpm_delta = 0
while rpm_index > 0
    set mid_point = (rpm_index_lookup[rpm_index] + rpm_index_lookup [rpm_index − 1]) /
        2
    set rpm_delta = rpm − rpm_index_lookup [rpm_index − 1]
    if rpm > mid_point
        ; Rpm is higher than the mid point
        set rpm_delta = rpm_index_lookup[rpm_index] − rpm
        exit while
    end if
    set rpm_index = rpm_index − 1
end while
if rpm_delta < 0 then
    set rpm_delta = − rpm_delta
end if
; Load
set load_index = load_index_lookup size − 1
set load_delta = 0
while load_index > 0
    set mid_point = (load_index_lookup[load_index] + load_index_lookup[load_index − 1]) /
        2
    set load_delta = load − load_index_lookup[load_index − 1]
    if load > mid_point
        ; Load is higher than the mid point
        set load_delta = load_index_lookup[load_index] − load
        exit while
    end if
    set load_index = load_index − 1
end while
if load_delta < 0 then
    set load_delta = − load_delta
end if
``` the table indexes are calculated using the table index values, typically rpm & load, in step 820. If the rpm, load or cam angle delta values are greater than the setting for the maximum rpm, load and cam angle deltas then exit the routine in step 830. The current lambda adjustment value is read from the table, and a new adjustment value is calculated in step 840 as the difference between the current lambda and target lambda, multiplied by the setting for fuel change be cycle, and added to the old adjustment value. If the new adjustment value In the foregoing routine, the rpm, load and current camshaft position are read in step 900 of FIG. 12. Then the index position is initialized in step 910 to the size of the cam angle tables. The mid point of the index values is calculated in step 920 as the average of the index value for the index position added and the index value for the next index position. If the current camshaft position is greater than the mid point, then the delta is recorded and the loop is exited in step 930. Otherwise, the index position is decremented in step 940 and the routine is looped. Calculating the rpm & load index routines are similar to the cam angle routine above.

Using the code above, the sample active tuned fuel adjustment table before driving found above is modified as follows after driving:

| | Col | | | | | | | | | |
|---|---|---|---|---|---|---|---|---|---|---|
| | 1 | 2 | 3 | 4 | 5 | 6 | 7 | 8 | 9 | 10 |
| kPa | 12 | 20 | 29 | 40 | 51 | 63 | 74 | 86 | 97 | 103 |
| 500 | 0.00 | 0.00 | 0.00 | 0.00 | 0.00 | 0.00 | 0.00 | 0.00 | 0.00 | 0.00 |
| 800 | 0.00 | 0.00 | 0.00 | 0.00 | 0.00 | 0.00 | 0.00 | 0.00 | 0.00 | 0.00 |
| 1000 | 0.00 | 0.00 | 0.00 | 0.00 | 4.88 | 5.66 | 0.78 | 0.00 | 0.00 | 0.00 |
| 1250 | 0.00 | 0.00 | −1.17 | 6.64 | 5.86 | 0.98 | 11.13 | 4.49 | 0.00 | 0.00 |
| 1500 | 0.00 | 7.42 | 17.19 | 6.64 | 4.88 | 1.17 | 4.10 | 0.00 | 0.00 | 0.00 |
| 1750 | 0.00 | 4.10 | 11.52 | 8.40 | 9.38 | 5.08 | 7.62 | 2.93 | 0.00 | 0.00 |
| 2000 | 0.00 | 12.70 | 8.98 | 2.73 | 9.96 | 2.54 | 6.84 | 3.71 | −0.39 | 0.00 |
| 2250 | 0.00 | 10.16 | 0.98 | 1.95 | 10.35 | 0.78 | 5.66 | 3.32 | 0.00 | 0.00 |
| 2500 | 0.00 | 2.54 | 10.35 | 0.00 | 3.32 | 4.49 | 2.15 | 1.76 | 0.00 | 0.00 |
| 2750 | 0.00 | 12.11 | 5.66 | 6.64 | 3.71 | 4.88 | 6.84 | −0.39 | 0.00 | 0.00 |
| 3000 | 0.00 | 0.00 | 7.42 | −1.95 | 2.54 | 0.98 | 1.17 | 0.20 | 0.00 | 0.00 |
| 3500 | 0.00 | 0.00 | 7.81 | 2.93 | 2.54 | 1.56 | −6.45 | 0.00 | 0.00 | 0.00 |
| 4000 | 0.00 | 0.00 | 0.00 | 0.00 | 0.00 | 0.00 | −3.71 | 0.00 | 0.00 | 0.00 |
| 4500 | 0.00 | 0.00 | 0.00 | 0.00 | 0.00 | 0.00 | −1.56 | 0.00 | 0.00 | 0.00 |
| 5000 | 0.00 | 0.00 | 0.00 | 0.00 | 0.00 | 0.00 | 0.00 | 0.00 | 0.00 | 0.00 |
| 5500 | 0.00 | 0.00 | 0.00 | 0.00 | 0.00 | 0.00 | 0.00 | 0.00 | 0.00 | 0.00 |
| 5800 | 0.00 | 0.00 | 0.00 | 0.00 | 0.00 | 0.00 | 0.00 | 0.00 | 0.00 | 0.00 |
| 6000 | 0.00 | 0.00 | 0.00 | 0.00 | 0.00 | 0.00 | 0.00 | 0.00 | 0.00 | 0.00 |
| 7000 | 0.00 | 0.00 | 0.00 | 0.00 | 0.00 | 0.00 | 0.00 | 0.00 | 0.00 | 0.00 |
| 8100 | 0.00 | 0.00 | 0.00 | 0.00 | 0.00 | 0.00 | 0.00 | 0.00 | 0.00 | 0.00 |

I claim:

1. A method for an engine control unit to update internal tables based on feedback from an engine without external computing, comprising the steps of:
   providing flash memory and RAM memory in the engine control unit;
   copying fuel adjustment values from the flash memory to the RAM memory;
   modifying the fuel adjustment values copied to the RAM memory based on feedback from sensors while the engine control unit is running;
   reassigning the engine control unit to stop reading fuel adjustment value from the flash memory and begin reading fuel adjustment values from the RAM memory; and
   adjusting a fuel to air mixture in the engine based on the fuel adjustment values from the RAM memory.

2. The method of claim 1, further comprising:
   copying engine timing values from the flash memory to the RAM memory;
   modifying the engine timing values copied to the RAM memory based on feedback from knock sensors while the engine control unit is running;
   reassigning the engine control unit to stop reading engine timing values from the flash memory and begin reading engine timing values from the RAM memory; and
   adjusting a spark plug ignition timing in the engine based on the engine timing values from the RAM memory.

3. The method of claim 1, wherein at engine start-up, the engine control unit copies fuel adjustment values from flash memory to RAM memory after a disconnection from a power supply, and saves previous fuel adjustment values in the RAM memory until the engine control unit is disconnected from a power supply.

4. The method of claim 1, wherein a lambda sensor delay is determined to account for a delay between a lambda sensor reading and a change in engine conditions.

* * * * *